Figure 1:
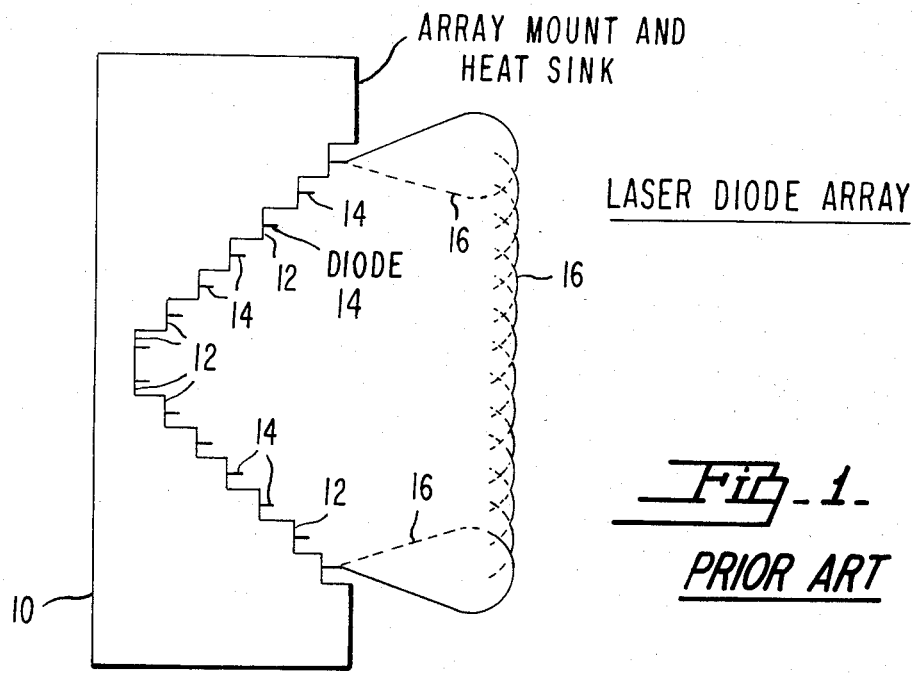

United States Patent
Hudson

[11] 3,901,578
[45] Aug. 26, 1975

[54] ILLUMINATOR EMPLOYING HOLOGRAPHIC TECHNIQUE

[75] Inventor: Kenneth Clifford Hudson, Philadelphia, Pa.

[73] Assignee: RCA Corporation, New York, N.Y.

[22] Filed: Mar. 18, 1974

[21] Appl. No.: 452,044

[52] U.S. Cl. .................................................. 350/3.5
[51] Int. Cl. ........................................... G02b 27/00
[58] Field of Search .............. 350/3.5, 96 B, 96 WG

[56] References Cited
UNITED STATES PATENTS

| | | |
|---|---|---|
| 3,529,887 | 9/1970 | Lu ........................................ 350/3.5 |
| 3,590,248 | 6/1971 | Chatterton ........................ 350/96 B |
| 3,677,622 | 7/1972 | Nishida et al. ....................... 350/3.5 |
| 3,743,376 | 7/1973 | Russell ................................. 350/3.5 |

Primary Examiner—Ronald J. Stern
Attorney, Agent, or Firm—Edward J. Norton; George J. Seligsohn

[57] ABSTRACT

The average radiance obtainable from an illuminator comprising a plurality of separate spaced light sources, such as laser diodes, which individually radiate light that is at least partially coherent, is increased by means of a recorded hologram which, when illuminated by the spaced light sources, derives a single resultant output light beam.

1 Claim, 3 Drawing Figures

PATENTED AUG 26 1975  3,901,578

ILLUMINATOR EMPLOYING HOLOGRAPHIC TECHNIQUE

This invention relates to an illuminator and, more particularly, to an illuminator employing a holographic technique to increase the average radiance ($w/cm^2/sr$) of the illumination obtainable therefrom.

As known in the art, (see Electronic Design, Oct. 25, 1970, pages 34 and 35) laser diode arrays have been developed employing a large number of closely spaced diode lasers operating at a cryogenic temperature of 77°K. to provide a radiated output of up to 2 killowatts peak power at a 2% duty cycle (40 watts average power) at a wavelength in the visible infrared region of the spectrum. Such a device, which is incapable of providing illumination through fog, smoke and camouflage, or beyond blinding lights, is useful for police, fire fighters and civilian intrusion-detection systems, as well as for military applications.

Despite the high packing density of the diodes in the array, the discrete lobes of radiation from the group of individual diodes making up each of the various subarrays of the complete array result in the brightness of the radiation from the array varying considerably from point to point over the surface of any area illuminated directly by the radiation pattern from the array. This makes the composite beam non-uniform and filamentary. Further, the spacing of the individual laser diode source elements of the array results in the average radiance of the array often being less than one percent that of the individual laser diodes.

In the past, it was necessary to employ an optical beam-smoothing element, such as a fibre-optic "scrambler" together with a very long focal length collimator lens, to achieve uniform radiance over the illuminated area. These additional elements, besides being costly, are large and bulky compared to the laser diode array itself. The holographic technique of the present invention makes it unneccesary to employ a scrambler and a long focal length collimator lens to obtain a uniform pattern. Further, the present invention makes it possible to increase the average radiance of the array so that it approaches or exceeds the intrinsic radiance ($watt/cm^2/steradian$) of the individual laser diodes in the array.

Briefly, this is accomplished by employing a hologram which is preferably a volume hologram, to effectively position the light from an array of light sources (e.g. laser diodes) in substantially coincident relationship, so that the effective light source provided by all the light sources of the array appear to originate at or nearly at the same point.

Figure 2:
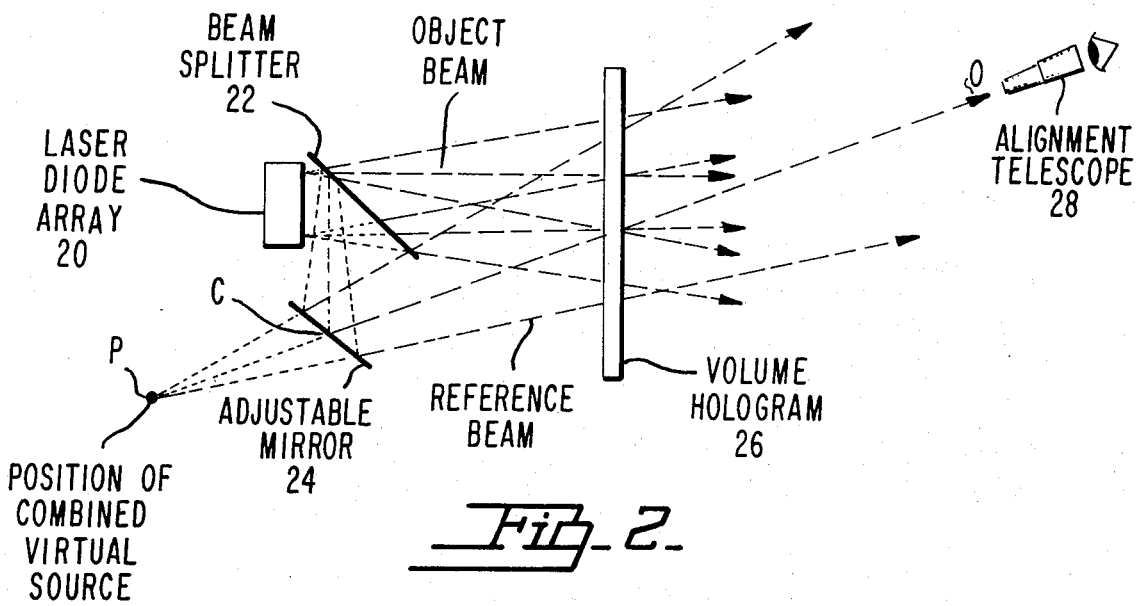
Figure 3:
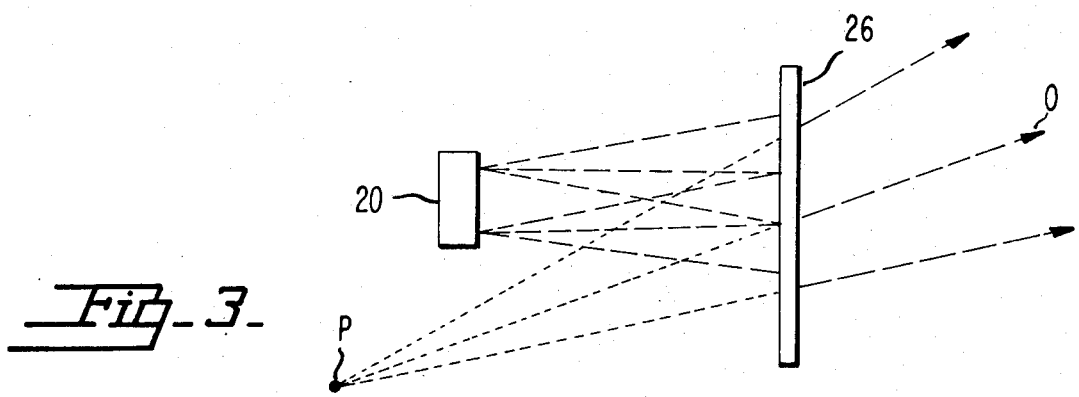

This and other features and advantages of the present invention will become more apparent from the following detailed description taken together with the accompanying drawing, in which:

FIG. 1 is a diagrammatic showing of the end view of a typical laser-diode array, FIG. 2 shows an arrangement for recording the hologram required by an illuminator embodying the present invention, and FIG. 3 shows an illuminator embodying the present invention.

Referring now to FIG. 1, as known in the prior art, a laser diode array comprises an array mount and heat sink 10, which is configured to have a plurality (14 in FIG. 1) of terraced surfaces 12. These terraced surfaces run the full length of the diode array in a direction into the paper. Mounted on each terraced surface is a string of spaced individual laser diodes 14. Because FIG. 1 is an end view, only a single laser diode 14 of each separate string is shown therein. The center-to-center spacing between adjacent diodes in the string may be about 0.33 millimeters with the length of the emitting area of each diode along the string (into the paper) being about 0.24 millimeters. However, the center-to-center spacing between adjacent string sub-arrays is much greater, being about 1.8 millimeters for example. Further, the emitting area of a diode perpendicular to its length is only a minor fraction of its length. Thus, the total emitting area of all the diodes is often only in the order of one percent of the total aperture area of the entire array.

The effect of this, as shown by the radiation lobes 16, is to provide a composite radiation beam which is non-uniform and filamentary in brightness over its cross-section.

Referring now to FIG. 2, there is shown the arrangement employed in the method of recording a hologram required by the illuminator of the present invention. This arrangement employs a laser diode array 20, which is similar in all material respects to the laser diode array of FIG. 1; beam splitter 22, formed by a partially reflecting mirror; adjustable mirror 24, which is angularly pivotable about a central point C thereof, and a hologram recording medium in which a volume hologram 26 is to be recorded. Laser diode array 20, beam splitter 22, central point C of adjustable mirror 24 and volume hologram 26 are situated in fixed, predetermined spaced relationship with respect to each other and may be held there by support means, not shown. Such support means are not shown because they form no part of the present invention and would obscure the drawing. For the same reason, the adjustment means for angularly adjusting the position of adjustable mirror 24 about a central point C thereof has not been shown.

In order to record the required information on volume hologram 26, alignment telescope 28 is used to select the reference line PCO. Since laser diodes radiate in the infrared region and there is a safety hazard in directly viewing laser radiation, alignment telescope 28 would normally be equipped with an infrared-to-visible light converter. Such converters are known in the art. In any event, an observer through the telescope is in the position to observe infra-red light reflected by adjustable mirror 24, if this reflected light is directed along reference line PCO.

The recording of the required information on volume hologram 26 is accomplished by energizing each of the individual lasers of laser diode array 20 in turn, one at a time. This results in volume hologram 26 being illuminated simultaneously by an object beam therefrom, which passes through beam splitter 22, and a reference beam therefrom which is reflected both by beam splitter 22 and adjustable mirror 24. Adjustable mirror 24 is observed through the recording medium of volume hologram 26 by alignment telescope 28. Adjustable mirror 24 is then adjusted to align the radiation received by alignment telescope 28 along reference line PCO. This process is repeated for each individual laser diode in laser diode array 20. A different angular adjustment of adjustable mirror 24 is required for each successive laser diode in the array in accordance with the respective spatial positions of the various laser diodes in laser diode array 20.

The adjustment of mirror 24 may be made with a laser diode receiving a relatively small amount of energization so that it is emitting incoherently as a light emitting diode. Thereafter, the energization to that laser diode may be raised to a relatively high level which will cause lasing and a high coherent output. In this manner, most of the recording wave energy is received by volume hologram 26 after the adjustment is complete.

In any event, the information recorded by this technique in volume hologram 26 provides substantially coincident virtual source positions for all of the laser diodes of array 20 in the vicinity of point P ; i.e., the adjustment of mirror 24 during the recording of each laser diode is such as to place the virtual image of that laser diode at or very near point P. Thus, a completely recorded volume hologram 26 can be employed to provide a combined virtual source at position P for the illuminator.

In use, as shown in FIG. 3, the illuminator consists solely of a laser diode array 20 and a volume hologram 26 which has been completely recorded by each of the laser diodes of the array in the manner described above in connection with FIG. 2. As known, the Bragg angle diffraction provided by a volume hologram is very efficient. Due to the manner in which volume hologram 26 has been recorded, volume hologram 26 diffracts the incident radiation from each separate laser diode in laser diode array 20 so that the output beam therefrom appears to originate at a virtual source at or in the immediate vicinity of point P.

Although the radiation from each laser diode of the array is coherent, the radiation from the respective diodes of the array is noncoherent with respect to each other. However, the resulting average radiance of the output beam from the illuminator along direction PO of FIG. 3 is increased. This is true because the intensity (watt/steradian) of the laser diode sources of laser diode array 20 have been practically undiminshed by the efficient Bragg angle diffraction, but the effective radiating area has been decreased. The separate beam intensities will add arithmetically since they are not coherent with each other.

Therefore, with the illuminator of the present invention it is possible to increase the average radiance of a laser diode array by a factor of as much as 100. This technique is not limited to laser diode array, but can be applied to arrays of other coherent or partially coherent sources, in order to increase the radiance of these sources.

Furthermore, although a volume hologram is to be preferred because of its high optical diffraction efficiency, the present invention also is applicable to thin or surface holograms.

What is claimed is:

1. An illuminator comprising:
   a. a plurality of spaced unmodulated substantially point light sources arranged in a predetermined array, wherein each light source radiates light which itself is at least partially coherent but which is noncoherent with respect to light radiated from any other light source and wherein each of said light sources is a laser diode light at the same wavelength band in the infared region, and
   b. a volume hologram recording medium situated in predetermined spaced relationship with respect to said array to have a given area thereof illuminated by light from said light sources, said area of said medium containing a predetermined hologram which is characterized by its ability when illuminated by said light sources to produce a single resultant output light beam composed of a respective beam component from each light source which appears to originate at a virtual substantially point source which is positioned in substantial coincidence with the virtual substantially point sources at which the respective beam components from the other light sources appear to originate.

* * * * *

UNITED STATES PATENT OFFICE
CERTIFICATE OF CORRECTION

PATENT NO. : 3,901,578

DATED : August 26, 1975

INVENTOR(S) : Kenneth Clifford Hudson

It is certified that error appears in the above-identified patent and that said Letters Patent are hereby corrected as shown below:

Column 1, line 14, change "visible" to --invisible--

Column 1, line 15, change "incapable" to --capable--

Column 4, line 24, after "diode" insert --radiating--

Column 4, line 31, after "predetermined" insert --volume--

*Signed and Sealed this*

*second* Day of *December 1975*

[SEAL]

Attest:

RUTH C. MASON
*Attesting Officer*

C. MARSHALL DANN
*Commissioner of Patents and Trademarks*